US011441529B1

(12) United States Patent
Powell et al.

(10) Patent No.: US 11,441,529 B1
(45) Date of Patent: Sep. 13, 2022

(54) SPARK/IGNITION SYSTEM FOR AN OPPOSED PISTON ENGINE

(71) Applicant: Warren Engine Company, Inc., Alexandria, VA (US)

(72) Inventors: Gregory B. Powell, Rockville, MD (US); James C. Warren, Alexandria, VA (US); William Vince Meyers, Jr., Alexandria, VA (US)

( * ) Notice: Subject to any disclaimer, the term of this patent is extended or adjusted under 35 U.S.C. 154(b) by 0 days.

(21) Appl. No.: 16/188,348

(22) Filed: Nov. 13, 2018

Related U.S. Application Data

(63) Continuation-in-part of application No. 15/650,844, filed on Jul. 14, 2017, now Pat. No. 10,662,893.

(60) Provisional application No. 62/585,068, filed on Nov. 13, 2017.

(51) Int. Cl.
| F02P 15/00 | (2006.01) |
| F02P 15/02 | (2006.01) |
| F02B 75/02 | (2006.01) |
| F02B 75/28 | (2006.01) |

(52) U.S. Cl.
CPC ............ *F02P 15/001* (2013.01); *F02B 75/02* (2013.01); *F02B 75/282* (2013.01); *F02P 15/02* (2013.01); *F02B 2075/027* (2013.01)

(58) Field of Classification Search
CPC ........ F02B 75/02; F02B 75/28; F02B 75/282; F02B 77/005; F02B 53/12; F02B 23/104; F02B 2075/027; F02B 2023/085; F02B 2023/102; F02P 15/001; F02P 15/005; F02P 15/02; F02P 15/08
See application file for complete search history.

(56) References Cited

U.S. PATENT DOCUMENTS

| 6,142,112 A * | 11/2000 | Leijonberg | F02B 75/28 |
| | | | 123/169 EA |
| 6,957,632 B1 * | 10/2005 | Carlson | F02B 25/26 |
| | | | 123/46 B |
| 7,448,352 B2 * | 11/2008 | Warren | F02B 75/282 |
| | | | 123/143 R |
| 8,659,216 B2 * | 2/2014 | Below | H01T 13/32 |
| | | | 313/141 |
| 8,800,506 B2 * | 8/2014 | Dougherty | F02B 75/246 |
| | | | 123/51 R |
| 9,708,976 B1 * | 7/2017 | Warren | F02B 75/00 |
| 10,174,713 B2 * | 1/2019 | Dion | F02F 3/16 |
| 2002/0067111 A1 * | 6/2002 | Shibata | H01T 13/39 |
| | | | 313/141 |
| 2004/0221823 A1 * | 11/2004 | Warren | F02B 75/282 |
| | | | 123/45 R |

(Continued)

OTHER PUBLICATIONS

Abdel-Rehim, Ahmed A., Impact of spark plug number on ground electrodes on engine stability, Ain Shams Engineering Journal (2013) vol. 4, pp. 307-316. (Year: 2012).*

*Primary Examiner* — Grant Moubry
(74) *Attorney, Agent, or Firm* — Capitol Patent & Trademark Law Firm, PLLC

(57) ABSTRACT

A four-stroke opposed-piston engine contains a cylinder having a periphery and a combustion chamber and an ignition system, wherein the ignition system is fixed to the cylinder periphery and at least partially contained within the combustion chamber. During combustion, the ignition system is adapted to locate a spark within a fuel-rich predetermined region of the combustion chamber.

6 Claims, 26 Drawing Sheets

(56) References Cited

U.S. PATENT DOCUMENTS

2012/0031379 A1\* 2/2012 Zhou ...................... F01B 9/042
123/51 R

\* cited by examiner

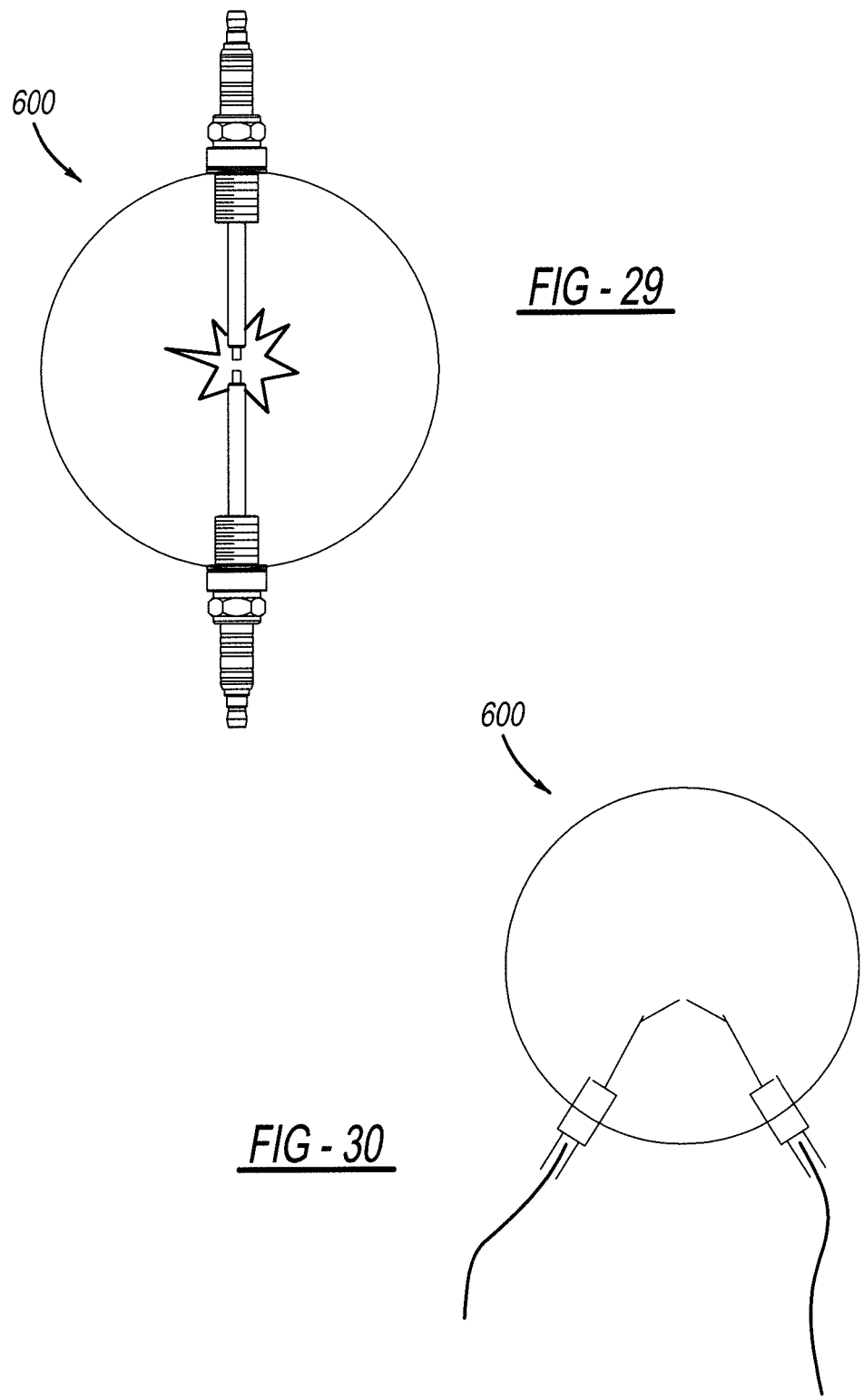

SPARK/IGNITION SYSTEM FOR AN OPPOSED PISTON ENGINE

CROSS-REFERENCE TO RELATED APPLICATIONS

This application claims the benefit of U.S. Provisional Patent Application Ser. No. 62/585,068 filed on Nov. 13, 2017, the teachings of which are herein incorporated by reference. This application is also a continuation-in-part application of co-pending and co-owned U.S. application Ser. No. 15/650,866 having a filing date of Jul. 14, 2017.

TECHNICAL FIELD

The present invention relates generally to improvements for an opposed-piston engine, and preferably a four-stroke engine, including providing enhanced ignition systems for the present four-stroke opposed piston engines.

BACKGROUND OF THE INVENTION

A continuing challenge is to optimize the power and fuel economy of a four-stroke opposed-piston engine. A related challenge is to reliably ignite a fuel-air mixture within a combustion chamber within a four-stroke opposed-piston engine. Historically, increasing the relative power of an opposed piston engine has been restrained by the fact that most, if not all, earlier designs of opposed piston engines were two-stroke engines. Recent advents in the design of opposed-piston engine technology includes providing four-stroke technology in context with the opposed-piston combustion chamber design. One related challenge has been to optimize the combustion reaction within the combustion chamber, and in doing so, increase the ignition efficiency of the fuel-air mixture and as such, increase the power output produced upon combustion. To that end, it is critical that the combustion chamber realize increased fuel-air mixtures, along with enhanced means to ignite this mixture.

SUMMARY OF THE INVENTION

In accordance with the present invention, a four-stroke opposed-piston engine contains: a cylinder having a periphery; a first piston and a second piston opposed to the first piston, each piston contained within the cylinder, the first piston containing a first shaped piston face, and the second piston containing a second shaped piston face; a combustion chamber defined by the first shaped piston face and the second shaped piston face in opposition to the first shaped piston face, within the cylinder; and an ignition system at least partially contained within the combustion chamber, wherein during combustion, the ignition system is adapted to locate a spark within a central region of the combustion chamber. The term "central" is understood to mean within a central region, wherein the central region is defined to be a region that radially outwardly extends from a longitudinal axis of the cylinder to about half of the radius of the cylinder, along a portion of the length of the cylinder that defines the length of the combustion chamber.

The aforementioned ignition system may contain a positive electrode extending from a first cylinder peripheral position to a first predetermined position within the combustion chamber, and, a ground (or negative) electrode extending from a second cylinder peripheral position to a second predetermined position within the combustion chamber. During operation of the engine, the positive electrode and the ground electrode electronically communicate to generate a spark. The first position may for example be at the 9:00 position of the cylinder wall and the second position may for example be at the 3:00 position of the cylinder wall. It will be appreciated that other outer radial positions may also define the individual placement of the positive and ground electrodes, respectively.

Alternatively, the aforementioned ignition system may contain a first spark plug located at a first position on the periphery of the cylinder, and, a second spark plug located at a second position on the periphery of the cylinder.

BRIEF DESCRIPTION OF THE DRAWINGS

FIG. 29 illustrates a view of yet another embodiment of an ignition system in accordance with the present invention.

FIG. 30 illustrates a view of yet another embodiment of an ignition system in accordance with the present invention.

DETAILED DESCRIPTION OF THE PRESENT INVENTION

Figure 1:
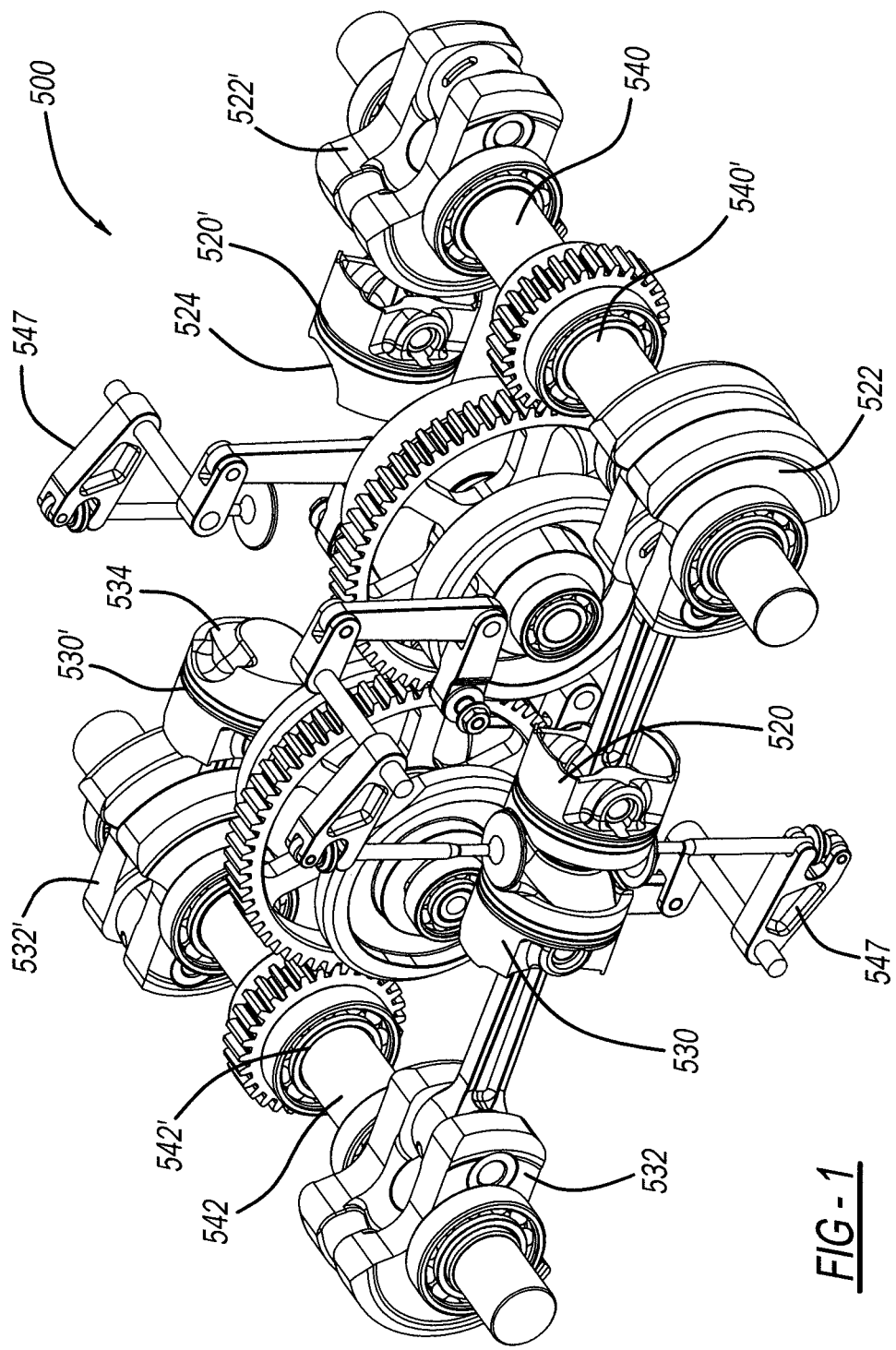
FIG. 1 is a perspective view of an exemplary engine, in accordance with the present invention.
Figure 2:
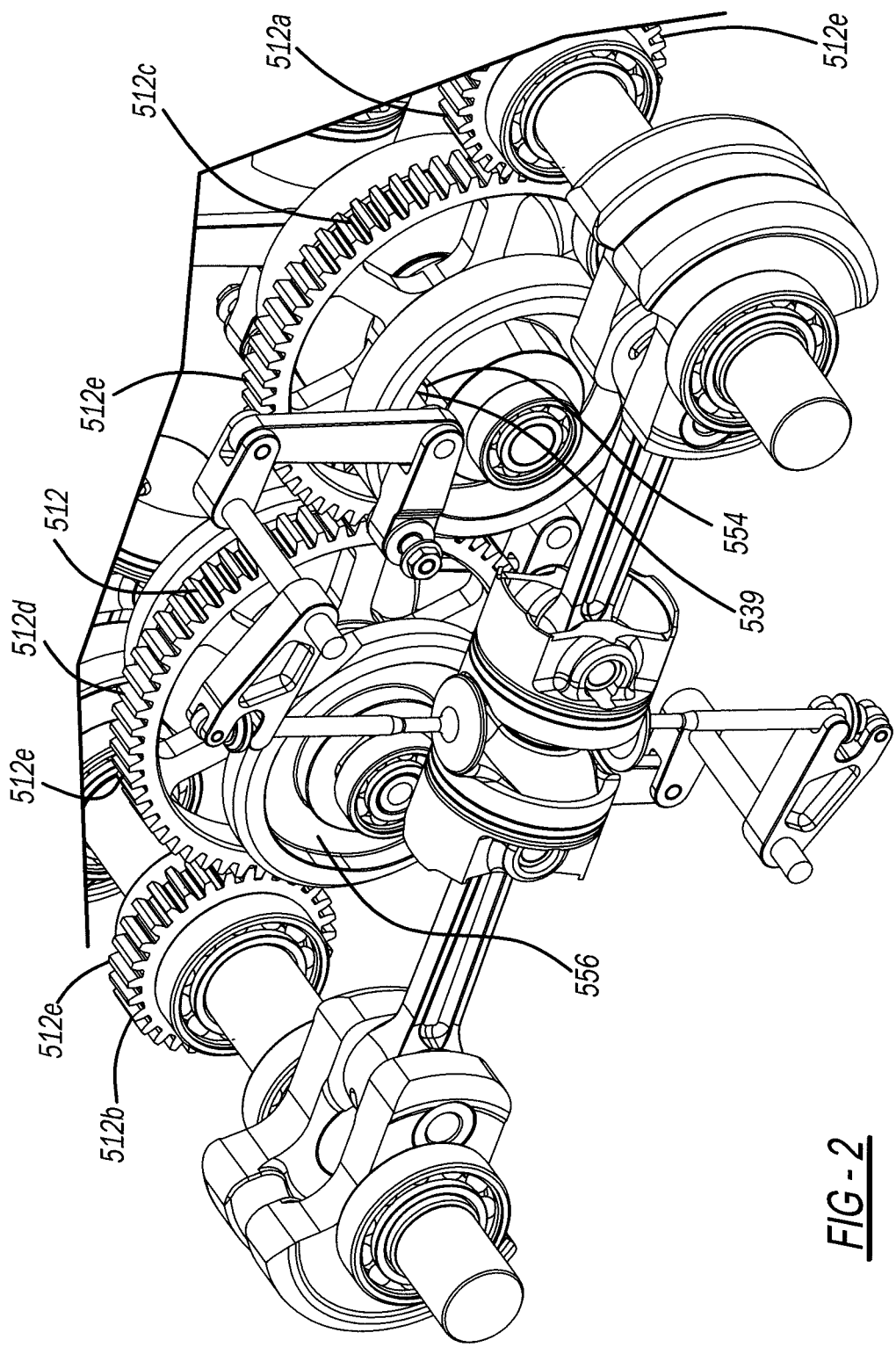
FIG. 2 is a perspective view of an exemplary engine, in accordance with the present invention.
Figure 3:
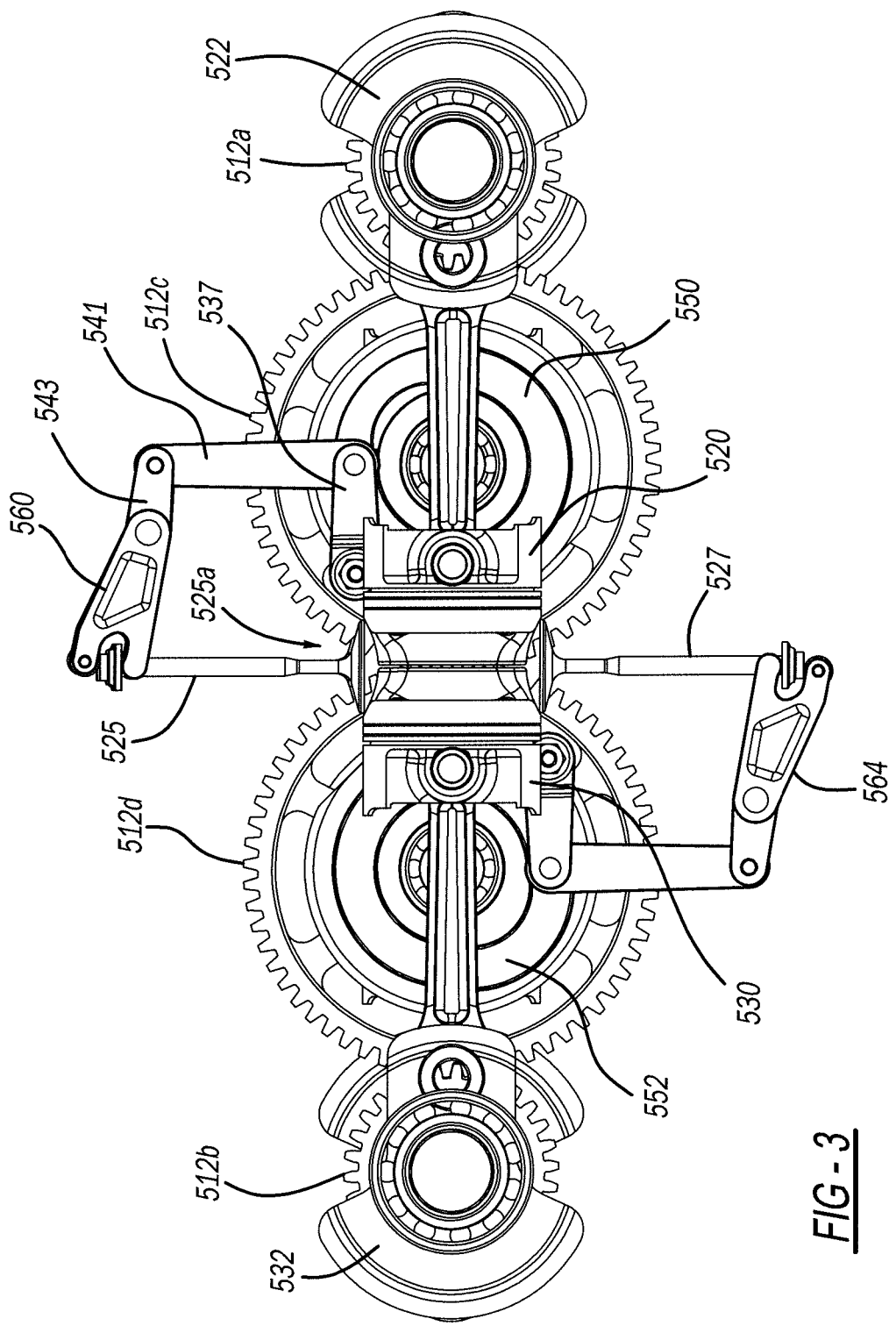
FIG. 3 is a side view of an exemplary engine, in accordance with the present invention.
Figure 4:
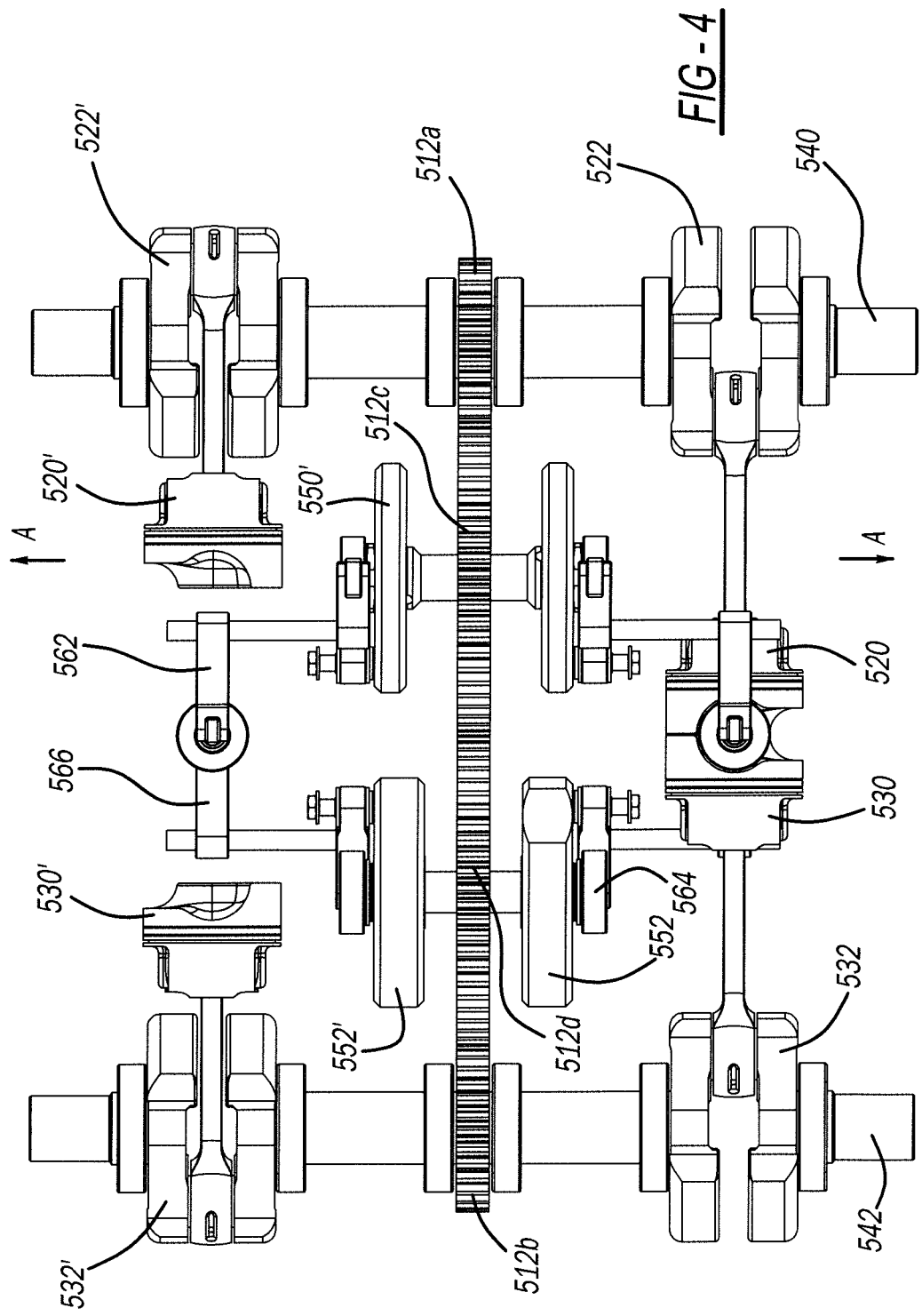
FIG. 4 is a top view of an exemplary engine, in accordance with the present invention.
Figure 5:
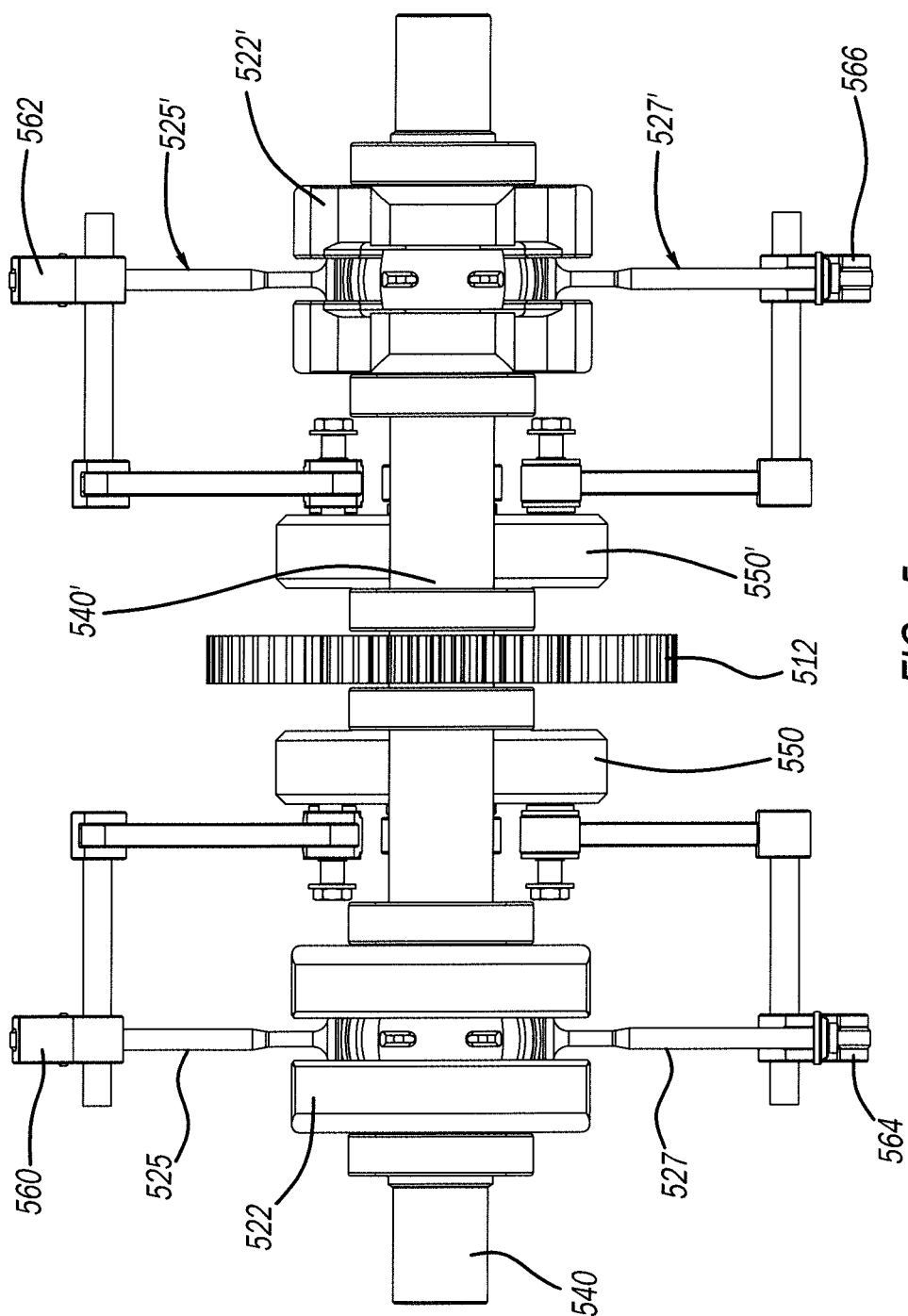
FIG. 5 is a rear view of an exemplary engine, in accordance with the present invention.
Figure 6:
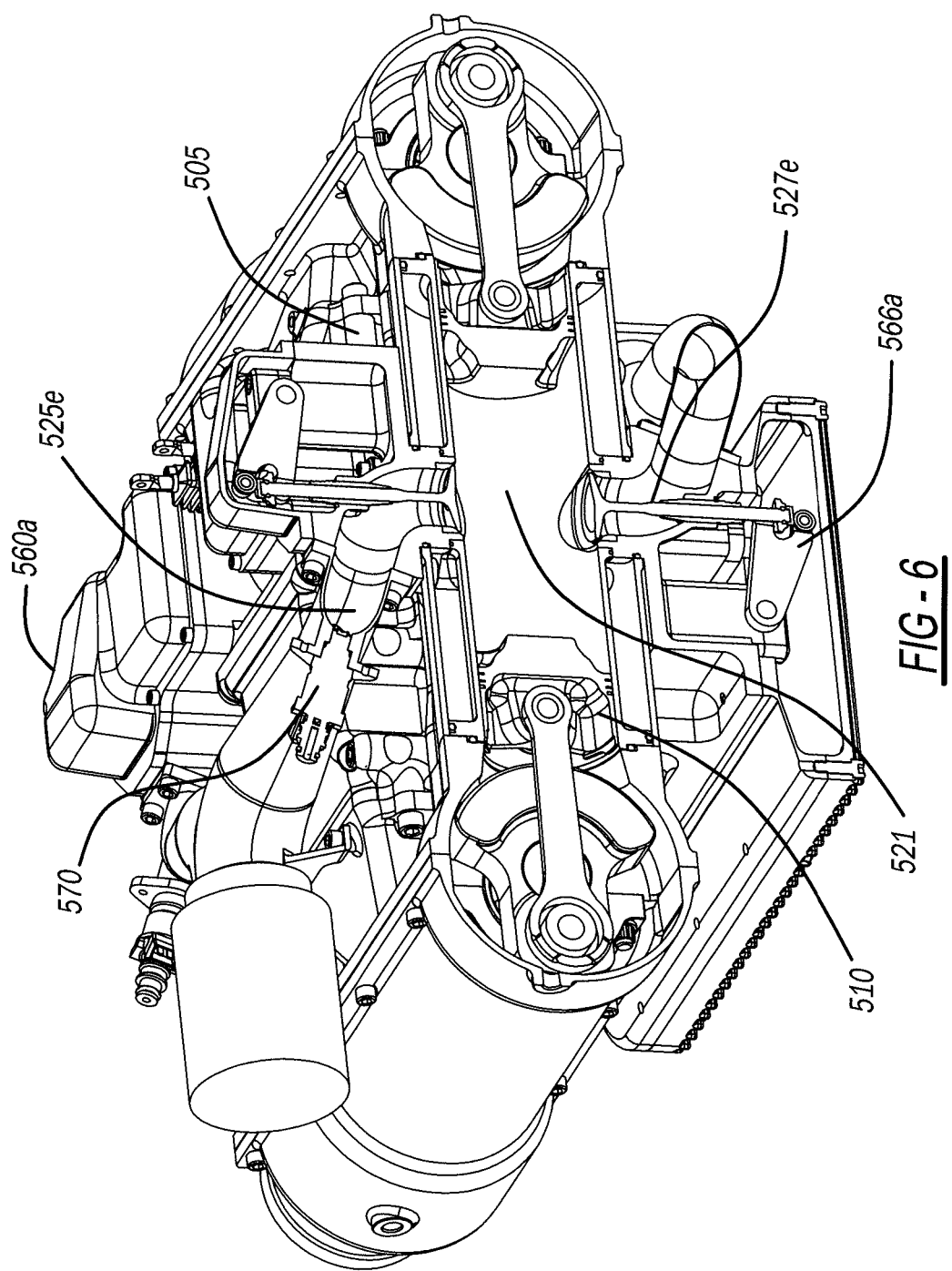
FIG. 6 is a cross-sectional view of two opposed pistons within an associated cylinder.
Figure 7:
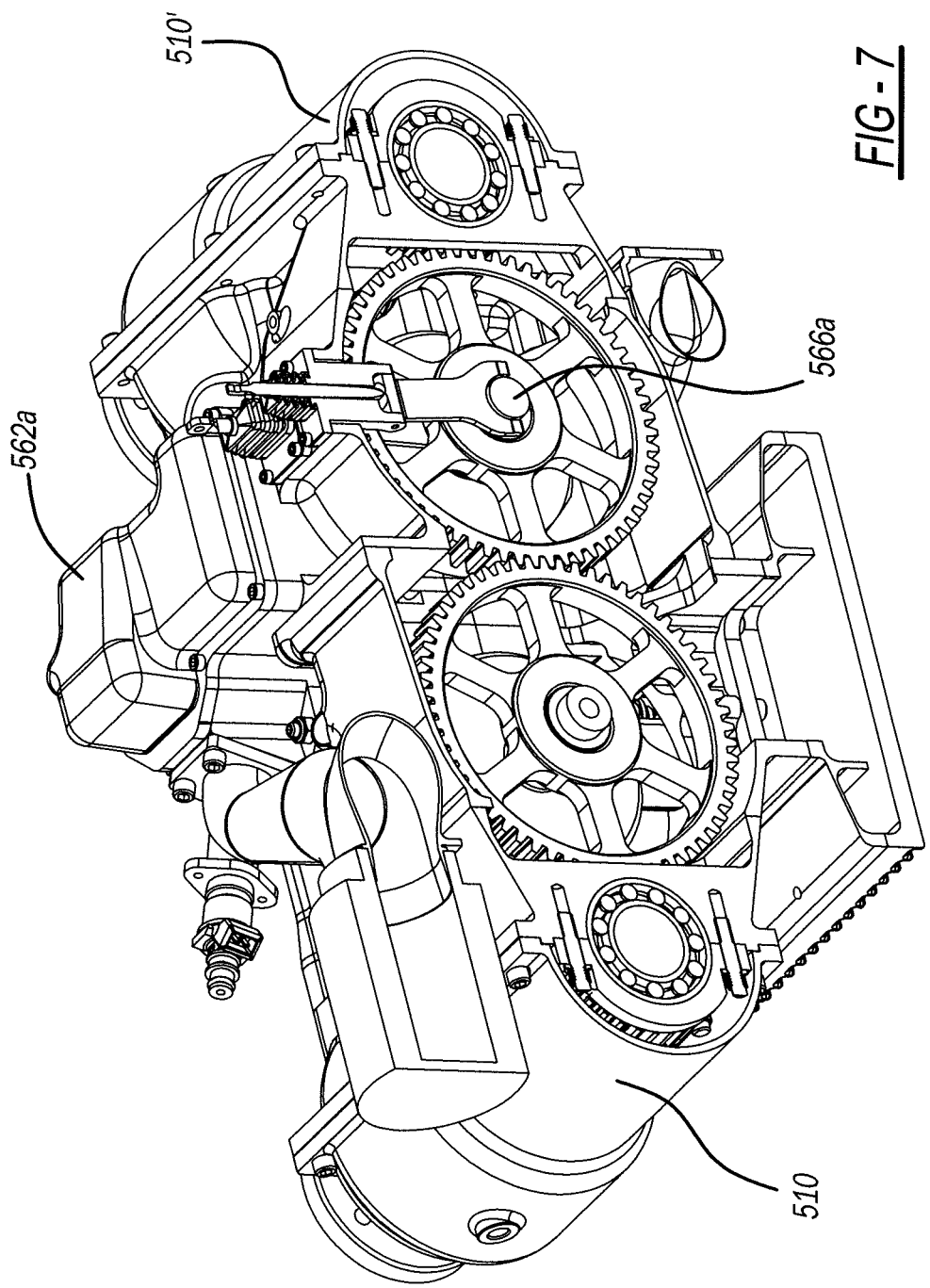
FIG. 7 illustrates valve covers in an exemplary engine.
Figure 8:
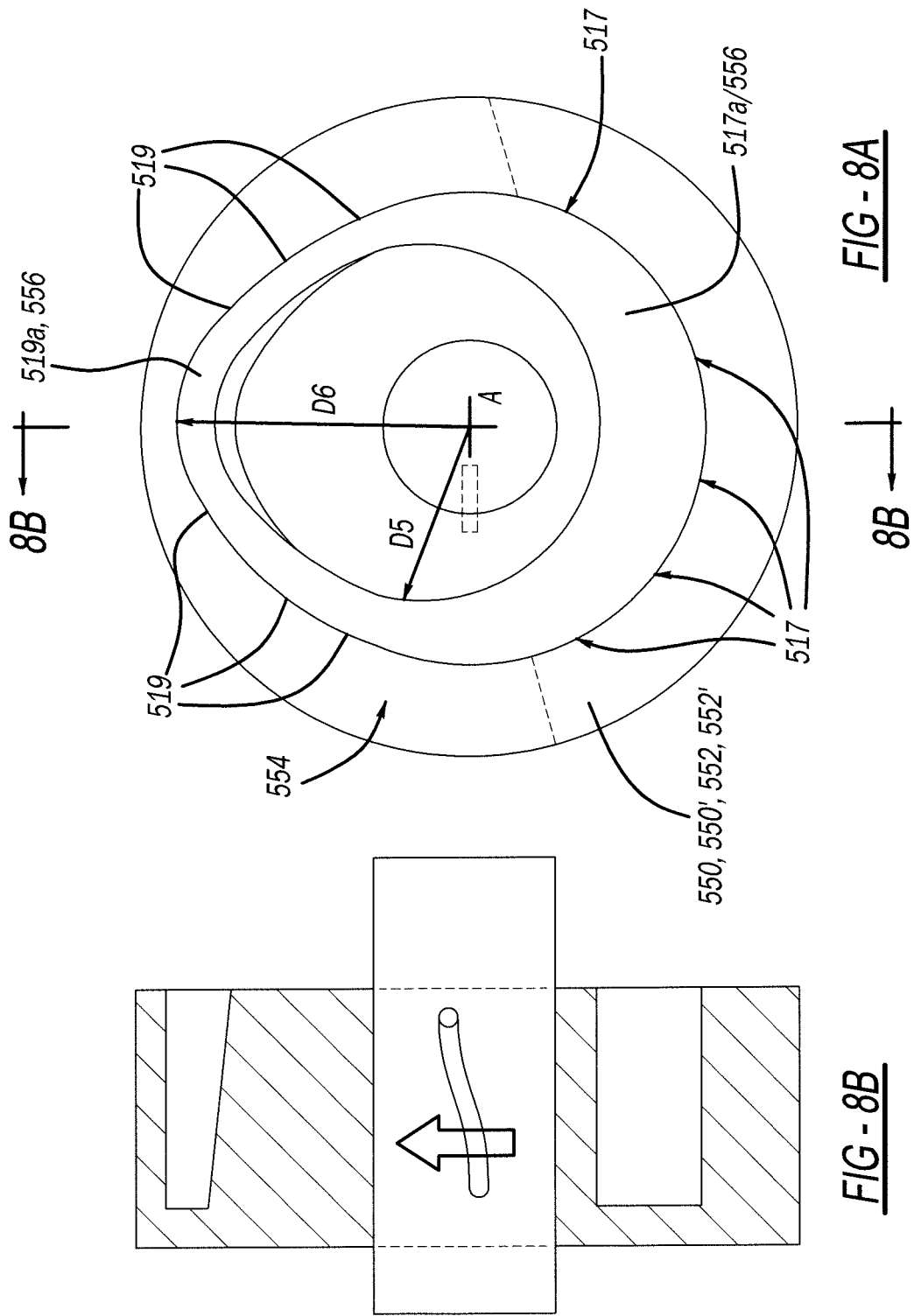
FIGS. 8A and 8B illustrate a Cam-Ring detail of one exemplary engine of the present invention.
Figure 9:
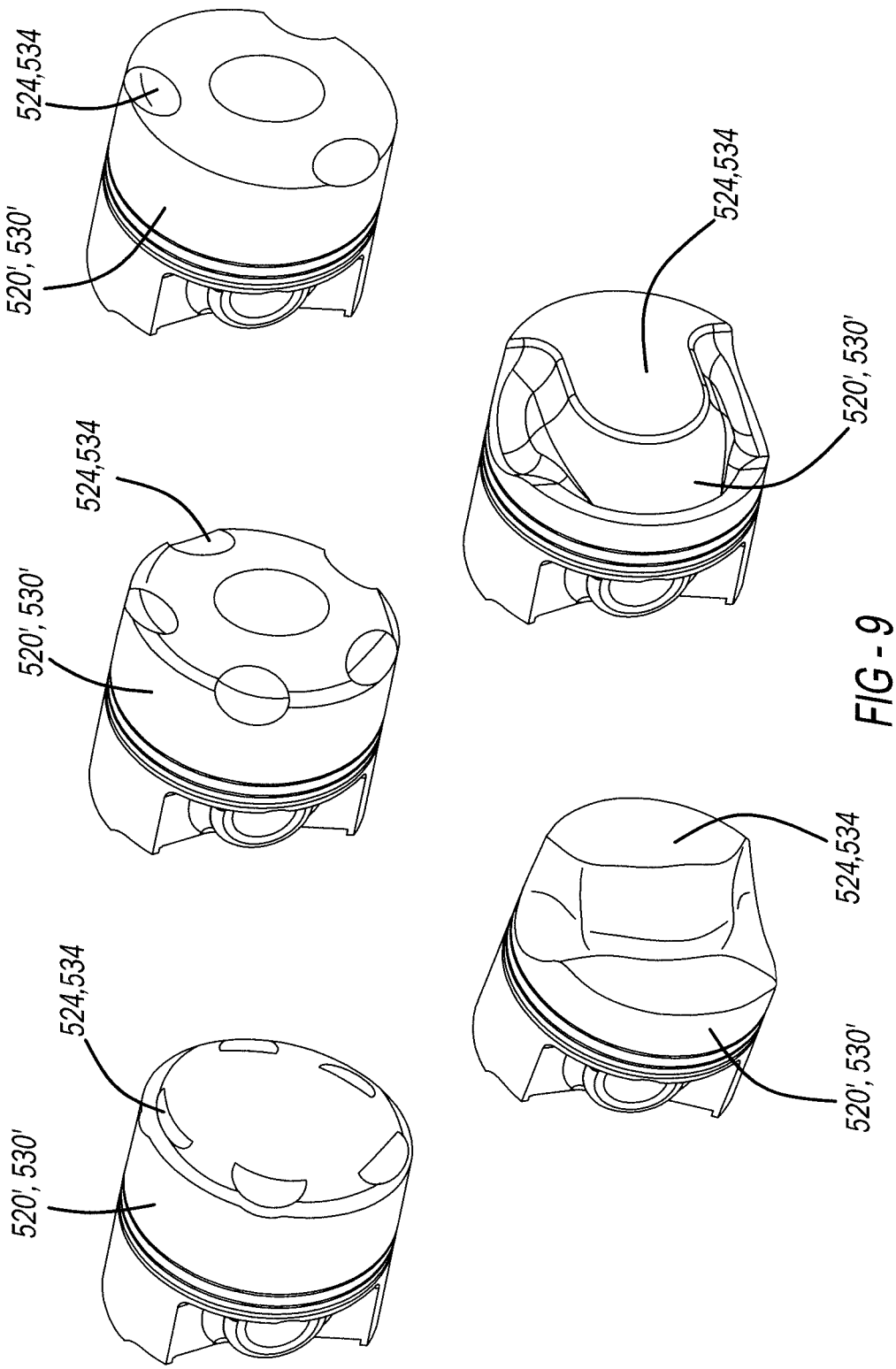
FIG. 9 illustrates various exemplary piston faces in accordance with the present invention.
Figure 10:
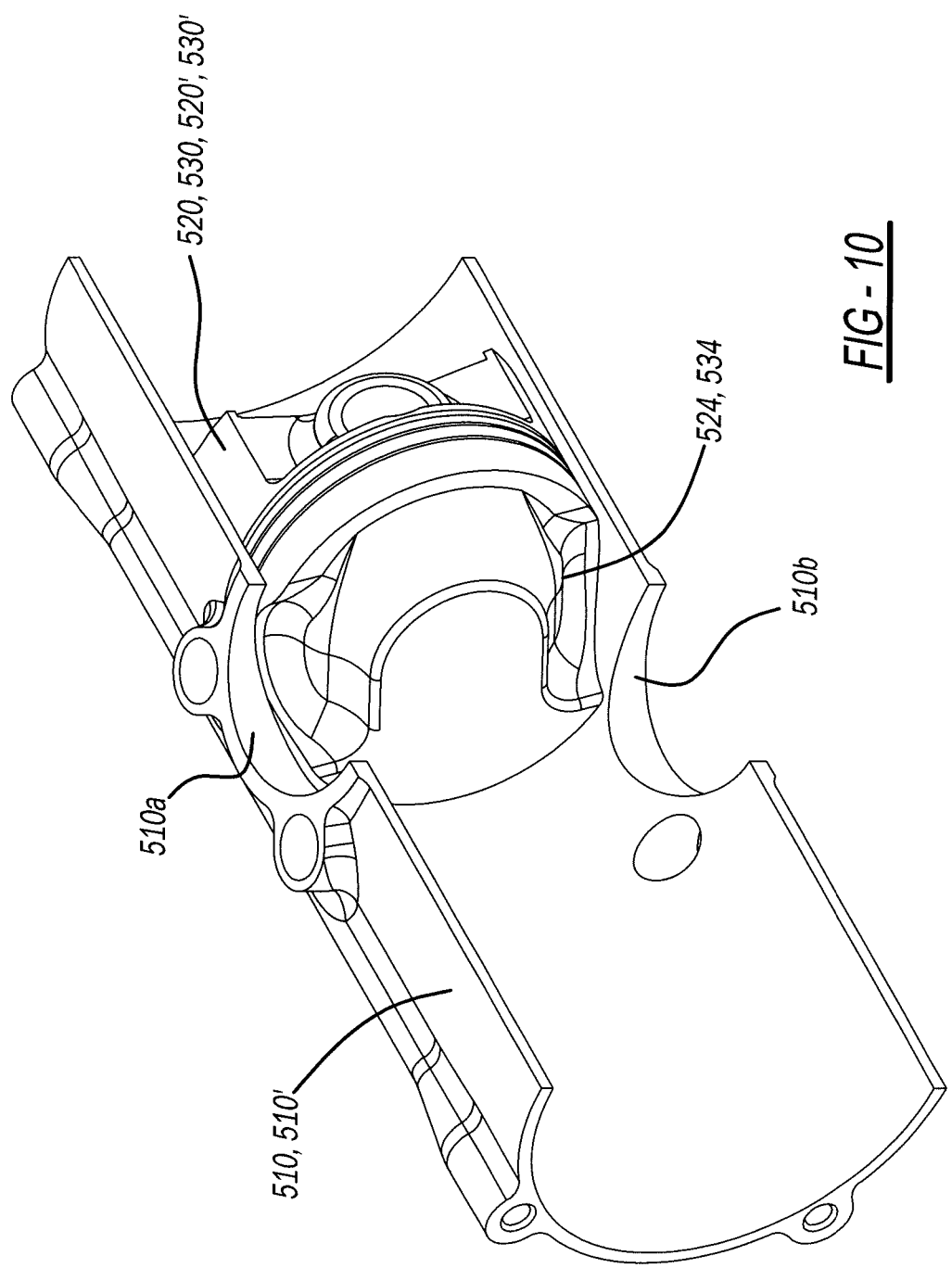
FIG. 10 illustrates a perspective cross-section of the combustion chamber and piston face in an exemplary engine.
Figure 11A:
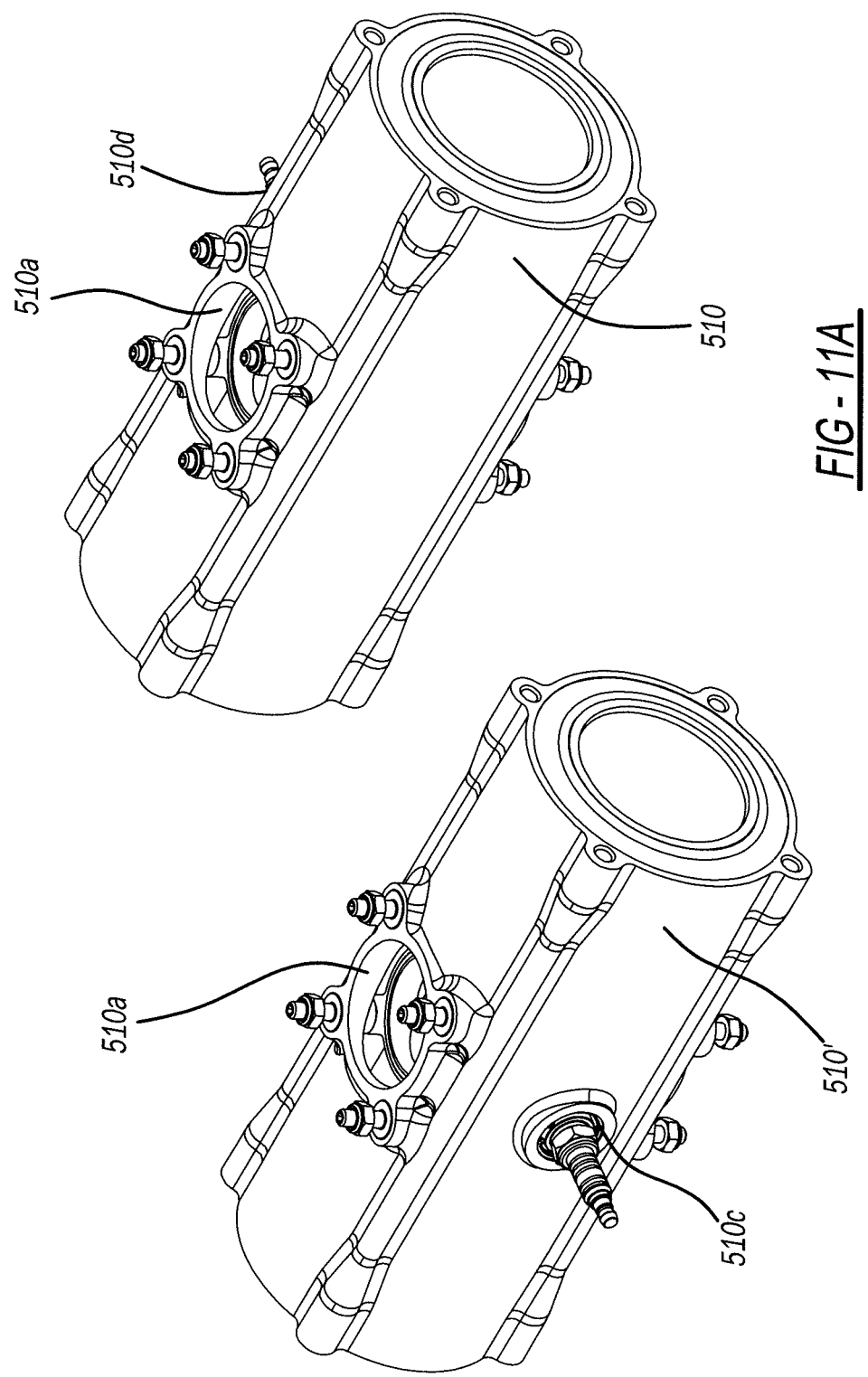
FIG. 11A illustrates two exemplary cylinders in accordance with the present invention.
Figure 11B:
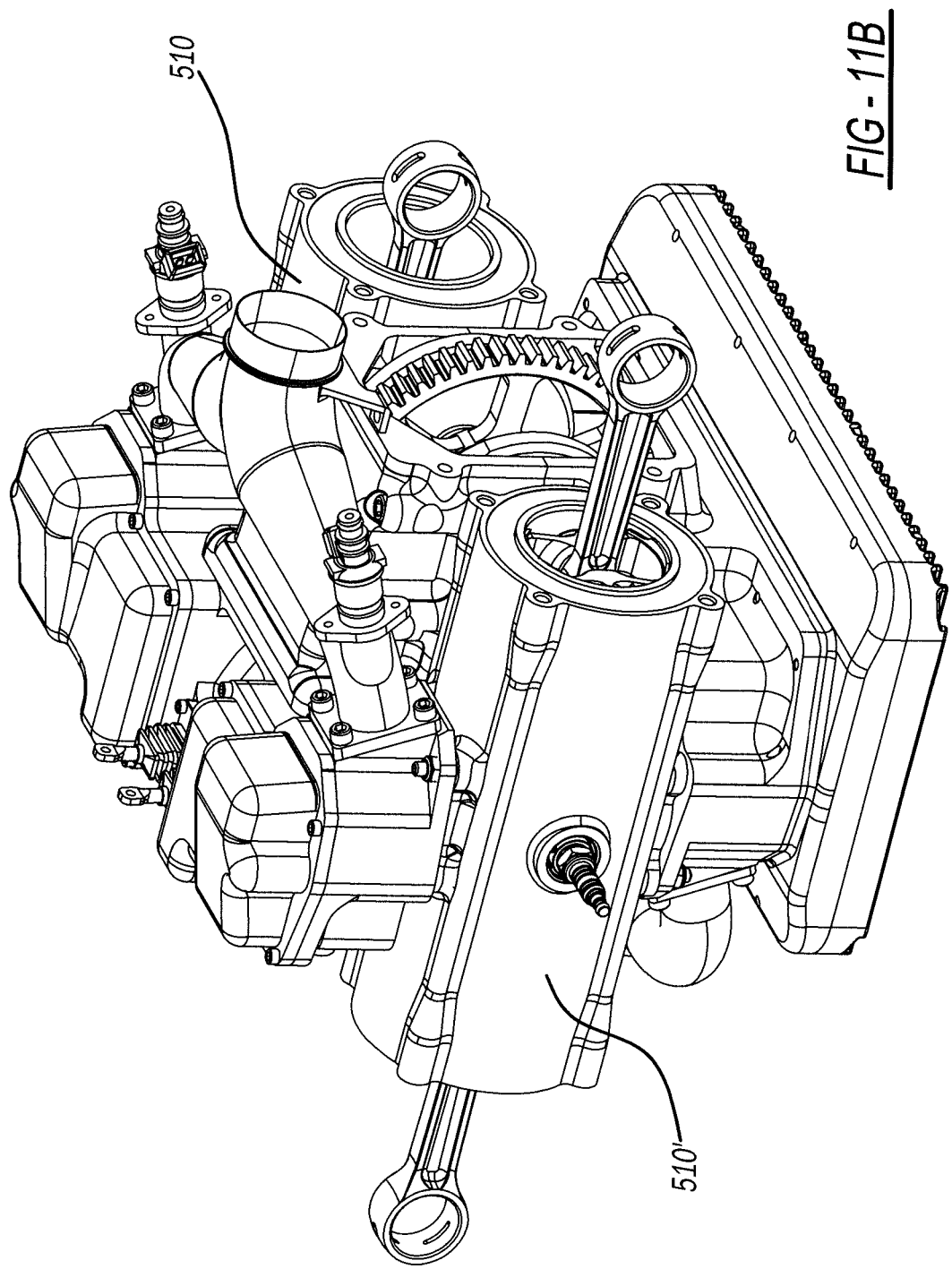
FIG. 11B illustrates two exemplary cylinders of FIG. 11A, with a valve assembly mounted thereon.
Figure 12:
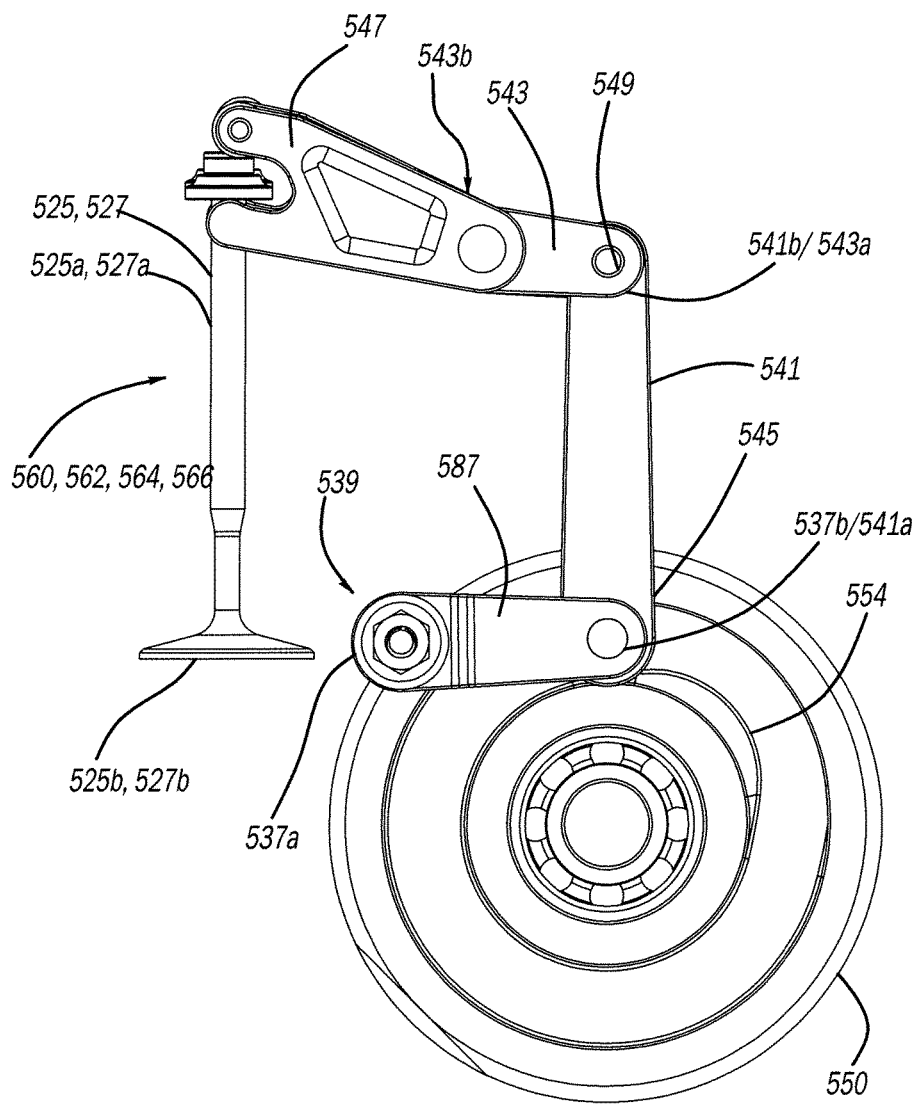
FIG. 12 illustrates an exemplary valve and cam assembly, in an exemplary engine of the present invention.
Figure 13:
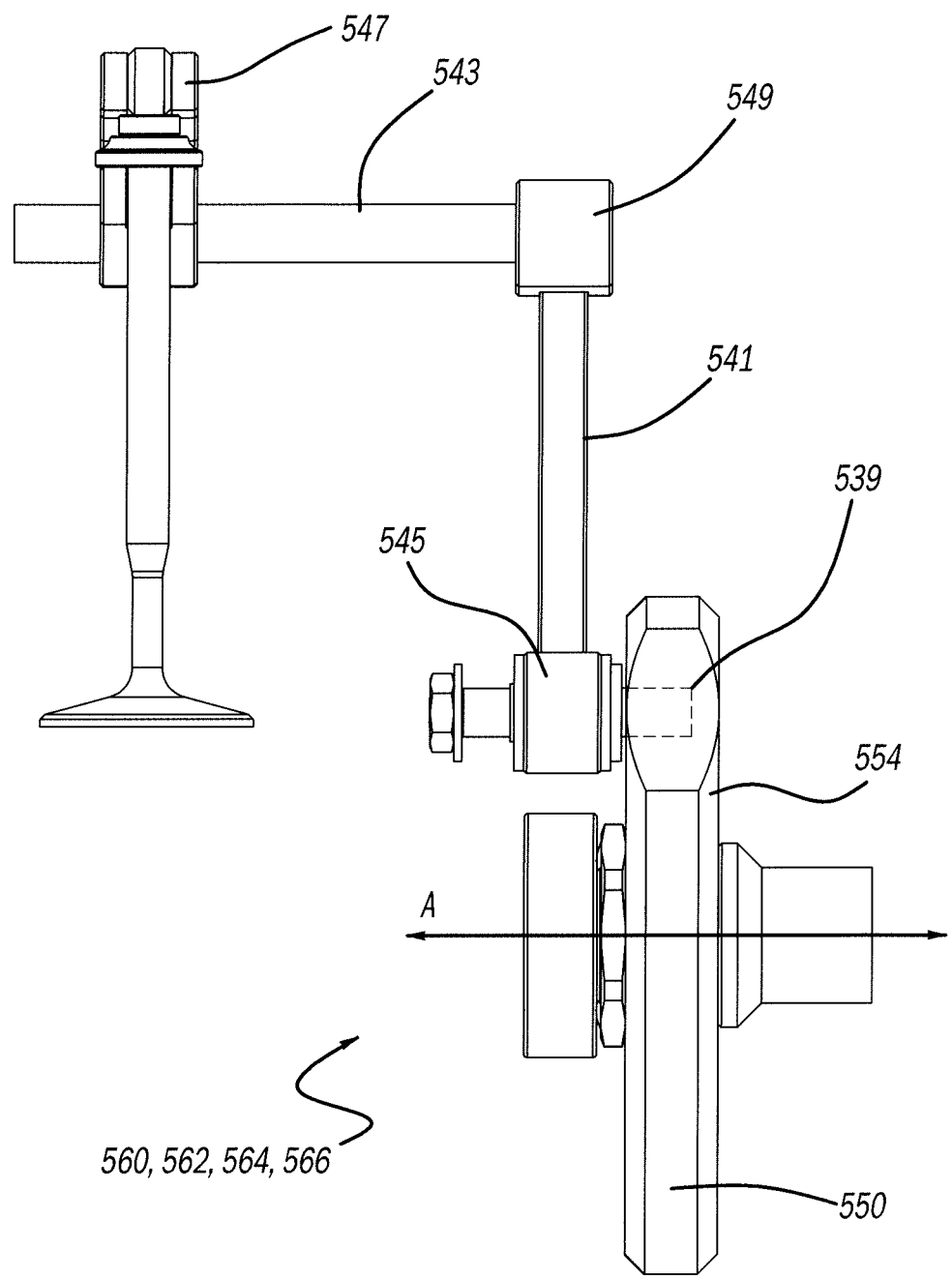
FIG. 13 illustrates a rear view of the valve and cam assembly of FIG. 12.
Figure 14:
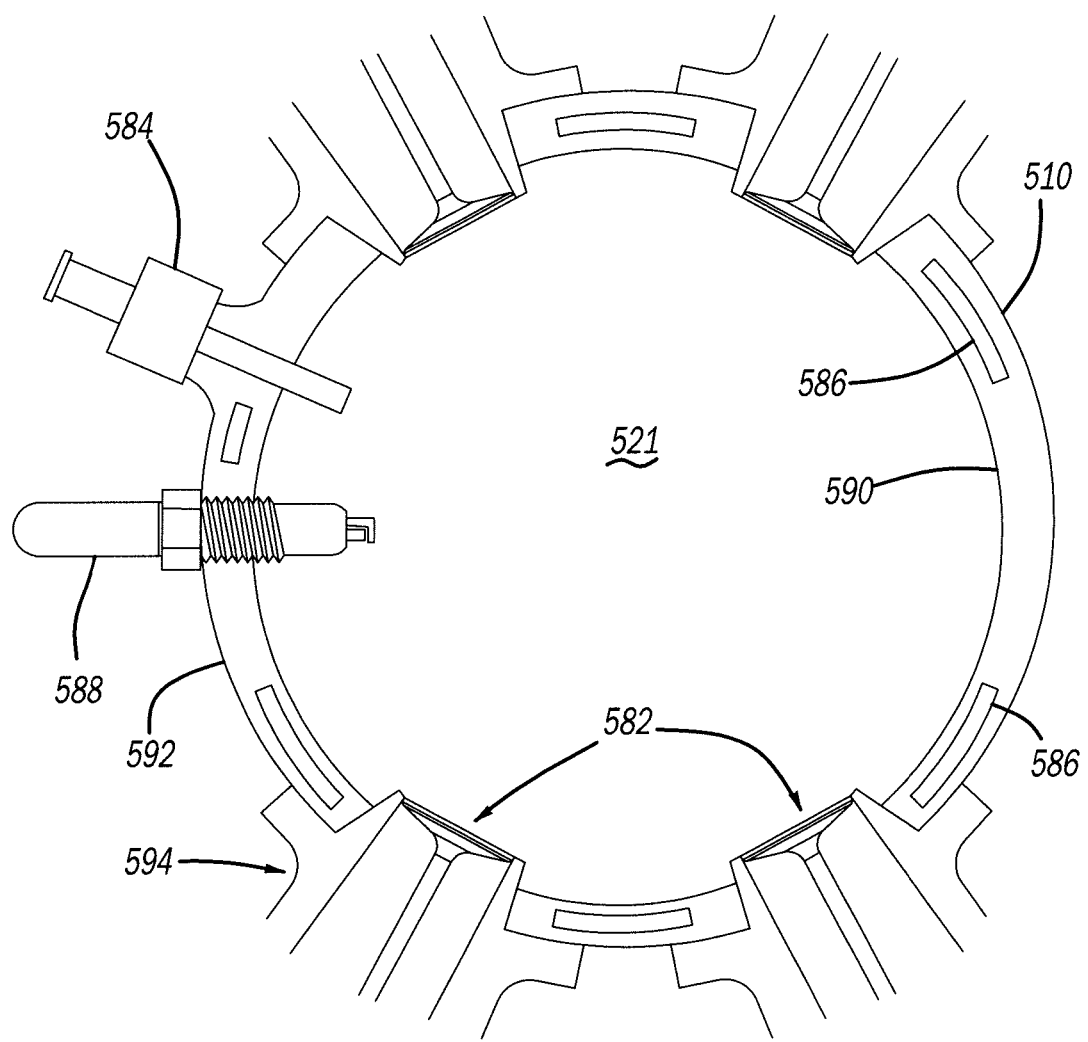
FIG. 14 illustrates an exemplary combustion chamber, in accordance with the present invention.
Figure 15:
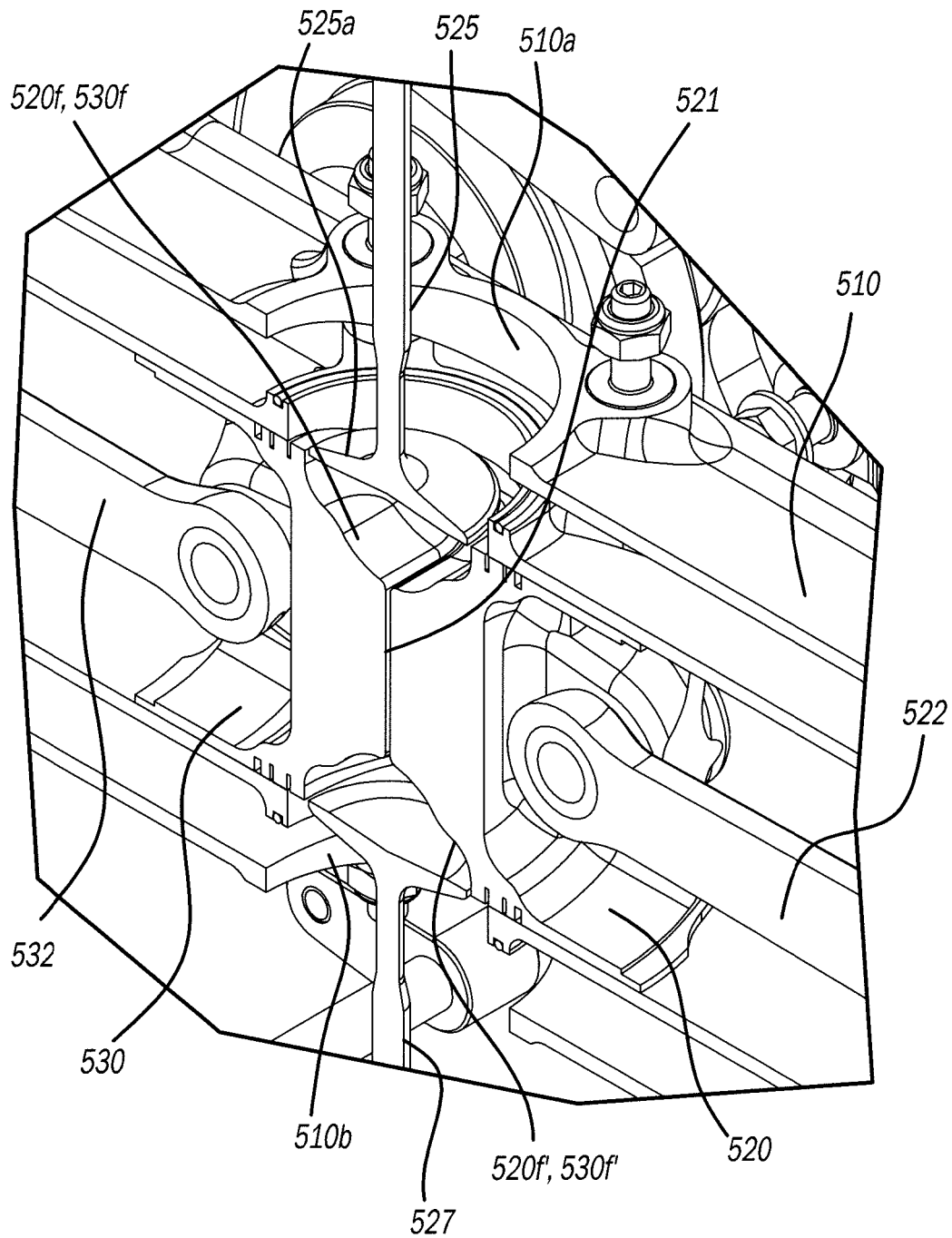
FIG. 15 illustrates two pistons at top dead center, in accordance with the present invention.
Figure 16:
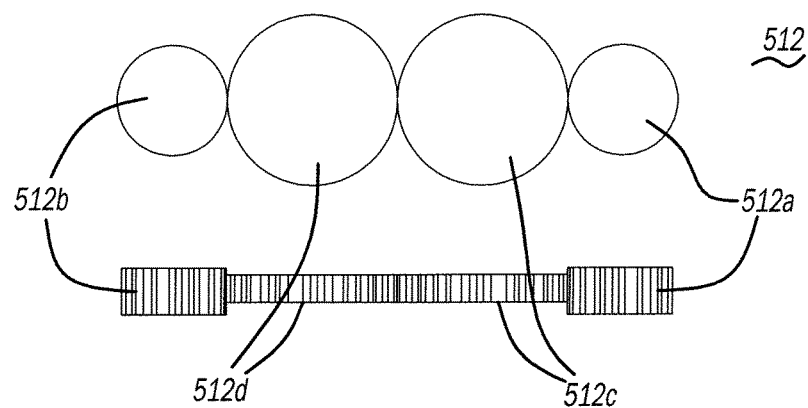
FIG. 16 illustrates a geared drive system of an exemplary engine of the present invention.
Figure 17:
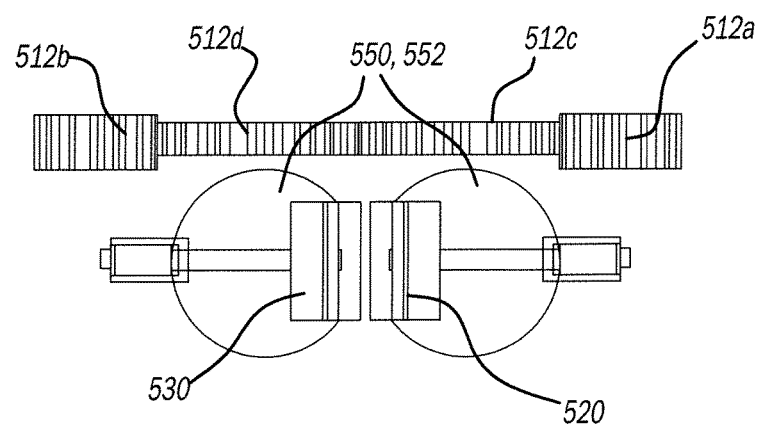
FIG. 17 illustrates a geared drive system of an exemplary engine of the present invention.
Figure 18:
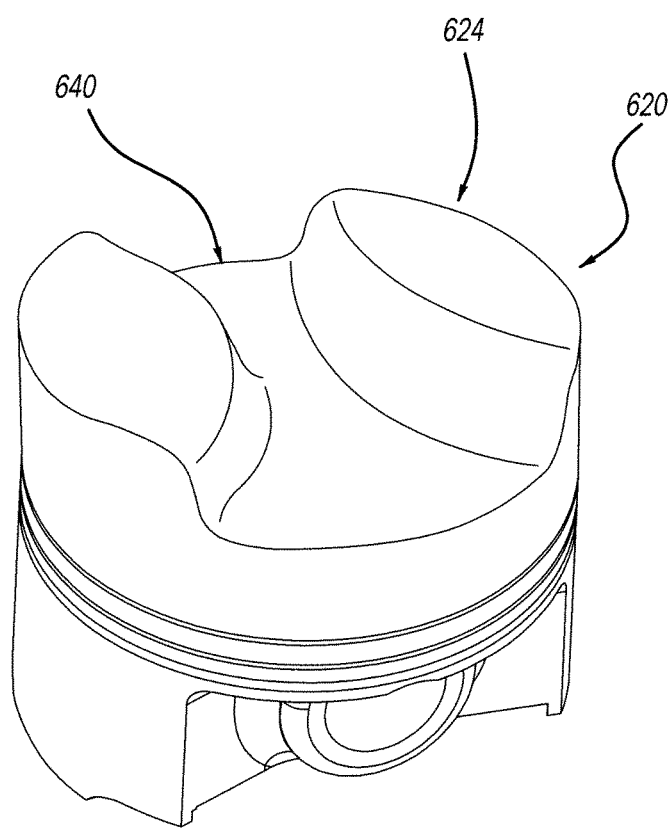
FIG. 18 illustrates an exemplary piston and piston face containing an hour-glass shaped recess.
Figure 19:
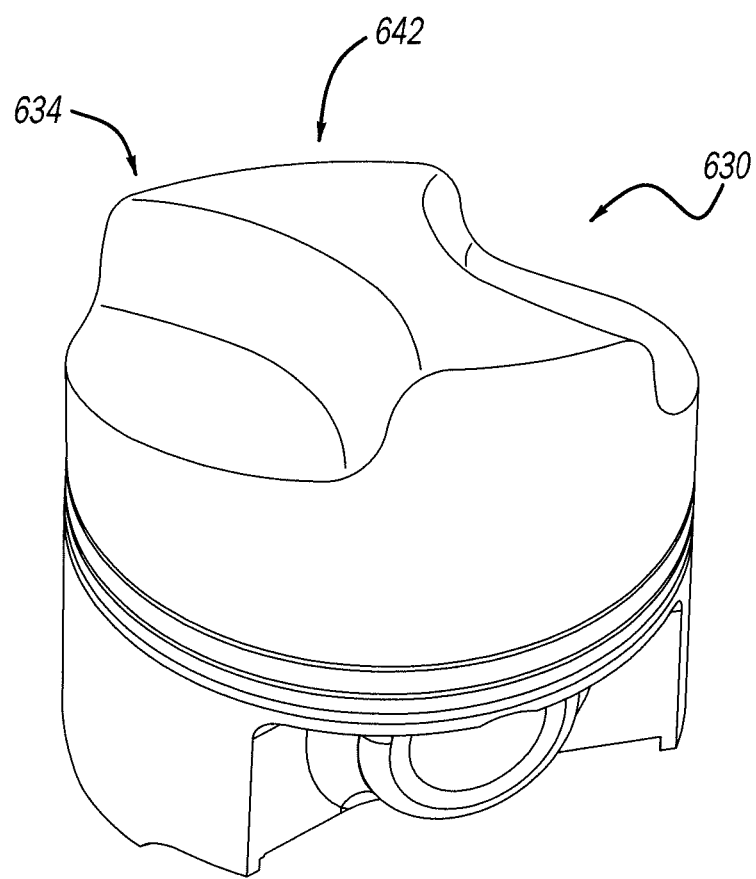
FIG. 19 illustrates an exemplary piston and piston face containing a complementary-shaped recess as compared to FIG. 18, and contains a raised portion that is shaped as an hour-glass.

The novel aspects of the present invention are presented below. U.S. Pat. Nos. 7,004,120 and 7,779,795, and U.S. patent application Ser. No. 13/633,097 are related to the present invention, the teachings of which are herein incorporated by reference in each of their entireties.

An exemplary opposed piston engine 500 contains an engine housing 505 containing a first cylinder 510 and a second cylinder 510'. A first pair of opposed pistons 520 and 530 are housed within the first cylinder 510. Although discussion is directed to the first cylinder 510 containing pistons 520 and 530, the same discussion is applicable with regard to additional cylinders 5 and opposed pistons, not shown, that may be combined in a multi-cylinder engine.

Referring to the FIGURES, opposed pistons 520 and 530 are connected via respective connecting rods 522 and 532 to respective crankshafts 540 and 542 mounted in the engine housing 505, as shown in the FIGURES. An exemplary engine housing may, for example only, be as described in U.S. Pat. No. 7,004,120. Pistons 520 and 530 reciprocate within cylinder 510 to rotate the crankshafts, in a manner known in the art. Each associated crankshaft and/or connecting rod is configured to aid in providing a predetermined stroke length to its associated piston residing within the cylinder. The opposed first and second pistons 520 and 530 may be of a relatively standard design, and may have predetermined lengths and predetermined diameters.

In one embodiment, the stroke length of each of pistons 520 and 530 is about 3 inches. Thus, the total difference between the spacing of the pistons at closest approach to each other (i.e., at "top dead center") may range from 0 inches to 0.25 inches, and more preferably from about 0.05 inches to 0.2 inches, and the maximum spacing of the pistons during the engine cycle (i.e., at "bottom dead center") is about 4-7 inches, and more preferably about 6 inches. As will be apparent to one of ordinary skill in the art, these distances may be altered depending on specific design criteria.

If desired, the piston lengths may be adjusted (to substantially equal lengths) for controlling spacing between the piston faces, thereby providing a means for adjusting the compression ratio and generally providing a predetermined degree of compression for heating intake air to facilitate combustion of a fuel injected or otherwise inserted into the combustion chamber. The piston lengths are geometrically determined in accordance with the piston stroke length and the lengths of apertures (described below) formed in the cylinders through which flow exhaust gases and air for combustion. In a first embodiment, each piston and piston cap are formed in a conventional manner, as shown in the FIGURES.

In another embodiment, each piston cap 524 and 534 may be formed from a sandwich of two sheets of carbon fiber with a ceramic center. The piston caps 524 and 534 which are exposed to the combustion event are formed so that when the two piston caps 524 and 534 meet in the center of the cylinder 510 they preferably form a somewhat toroidal, hour-glass-shaped, or otherwise-shaped cavity as the combustion chamber (not shown). Only the ceramic cores of the piston caps 524 and 534 actually come into contact with the stationary cylinder wall.

Each piston should have a length from the piston fire ring to the cap suitable for keeping the piston rings out of the cylinder opening 510a. The piston caps 524 and 534 each have a diameter roughly equal to the interior of the associated cylinder, and may be made of carbon fiber, ceramic, or any other suitable material to aid in minimizing thermal inefficiencies during engine operation.

Crankshafts 540 and 542 are coupled to an associated gear train, generally designated 512. The gear train 512, in accordance with the present invention, contains a first gear 512a that may be fixed to the first crankshaft 540 about an end portion 512a' thereof. The gear train further contains a second gear 512b fixed to the second crankshaft 542 about an end portion 512b' thereof. The gear train 512 further contains a third gear 512c with teeth enmeshed with the teeth of first gear 512a, wherein the third gear 512c is formed about the side periphery of the engine housing. The gear train further contains a fourth gear 512d with teeth enmeshed with the teeth of second gear 512b, formed about the side periphery of the engine housing, opposite to the third gear 512c. Accordingly, the movement of either gear 512a, 512b, or both, causes a consequential movement of the entire housing as the gears 512c and 512d rotate in response to the rotary movement of gears 512a and 512b, as shown in the Figures. In accordance with one embodiment of the present invention, the diameter d2 of the third and fourths 512c and 512d is twice the diameter d1 of first and second gears 512a and 512b, thereby resulting in a two to one ratio with regard to size of the inner gears 512c and 512d and the outer gears 512a and 512b. It will be appreciated that gears 512a-512d exemplify one drive mechanism, and that the drive mechanism 512 of the engine 500 may also be represented by a drive belts or drive chains, with the same size ratio between the respective driving elements of the belt or chain-driven drive mechanism.

In further accordance with the present invention, and in one embodiment of the present invention, the drive mechanism or gear train 512 converts rotational motion of the crankshafts to rotational motion of a first and second set of pluralities of magnets 550 and 552. Accordingly, the first set of magnets 550 are rotationally and coaxially fixed within a magnet sub-housing 550a and juxtaposed to and coaxially aligned with the third gear 512c, such that the gear 512c and the first set of magnets 550 all rotate at the same speed. In the same way, the second set of magnets 552 are rotationally and coaxially fixed within a magnet sub-housing 552a and juxtaposed to and coaxially aligned with the fourth gear 512d, such that the gear 512d and the second set of magnets 552 all rotate at the same speed.

In the embodiment shown in the FIGURES, a first cam disc 554 and associated cam groove 554a is formed on an inner exterior of the magnet sub-housing 550a, and operates the inlet valve 558 of the cylinder in a known way, using desmodromic valve technology or other known valve configurations, for example. In the same way, a second cam disc 556 and associated cam groove 556a is formed on an inner exterior of the magnet sub-housing 550b and operates the exhaust valve 560 of the cylinder in a known way, using desmodromic valve technology or other known valve configurations, for example. Each cam disc 554 and 556 are rotationally and coaxially fixed to respective magnet sub-housings 550a and 552a, such that respective gears 512c and 512d and the associated cam discs 554 and 556 all rotate at the same speed.

Various elements of the vehicle and/or engine systems (for example, an oil pump or coolant circulation pump) may be operatively coupled to and powered by the gear train 512, via the gears in the gear train itself or via shafts and additional gears operatively coupled to the gear train.

Figure 20:
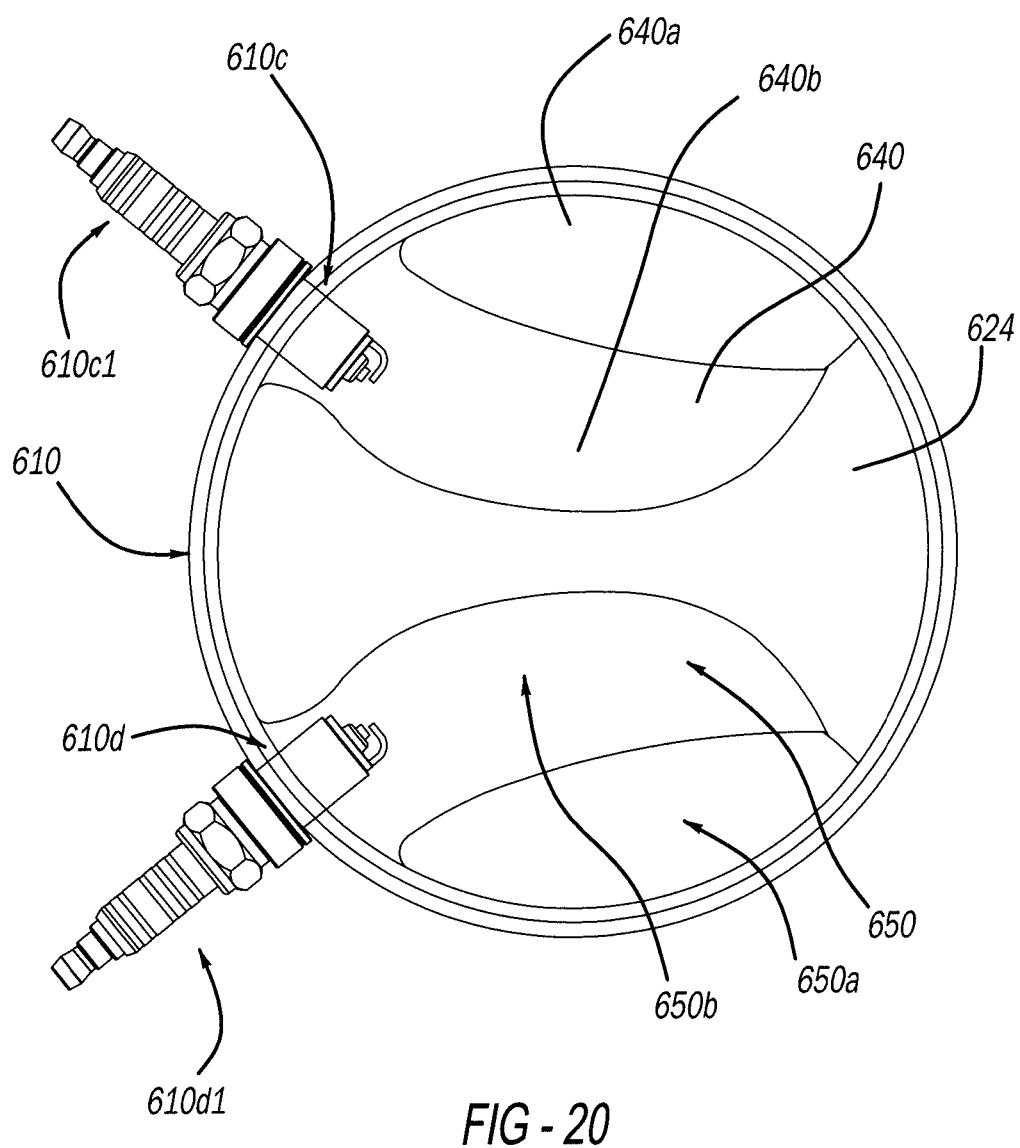
FIG. 20 illustrates an exemplary piston and piston face containing two ridges and two valleys, and two spark plugs contained within a first and a second valley.
Figure 21:
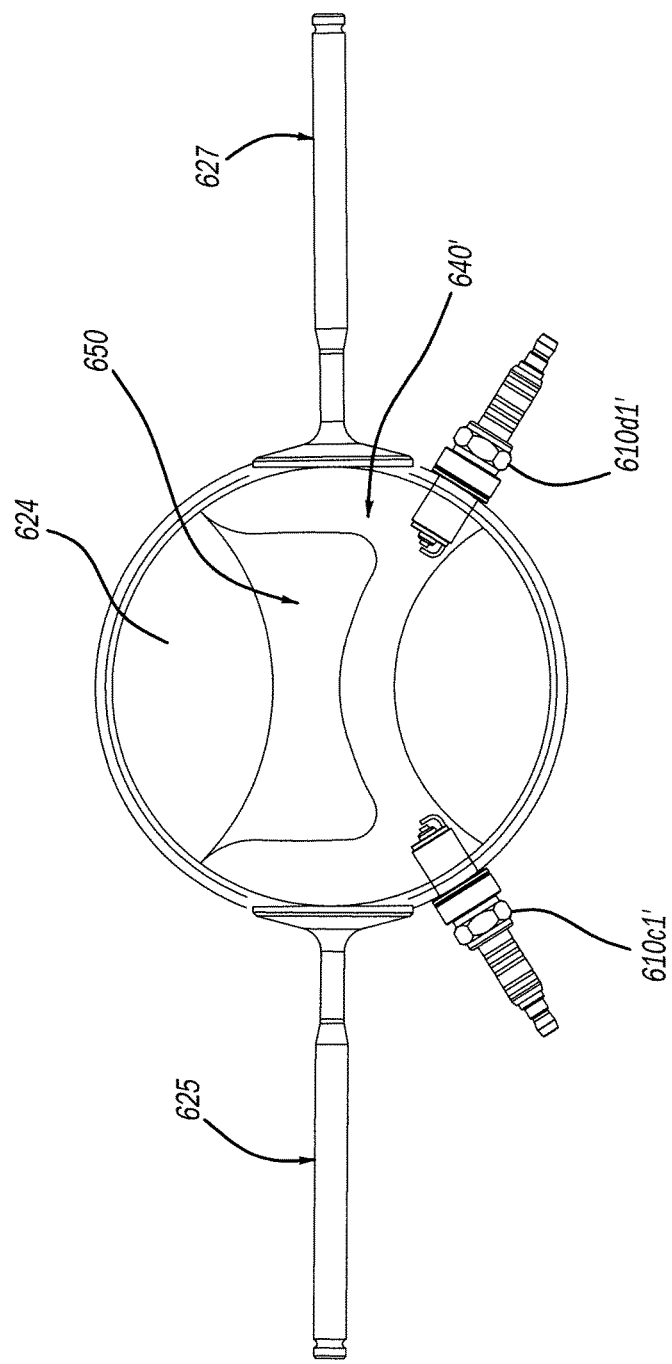
FIG. 21 illustrates an exemplary piston and piston face containing a ridge and a valley, and two spark plugs, each contained within the ridge.
Figure 22:
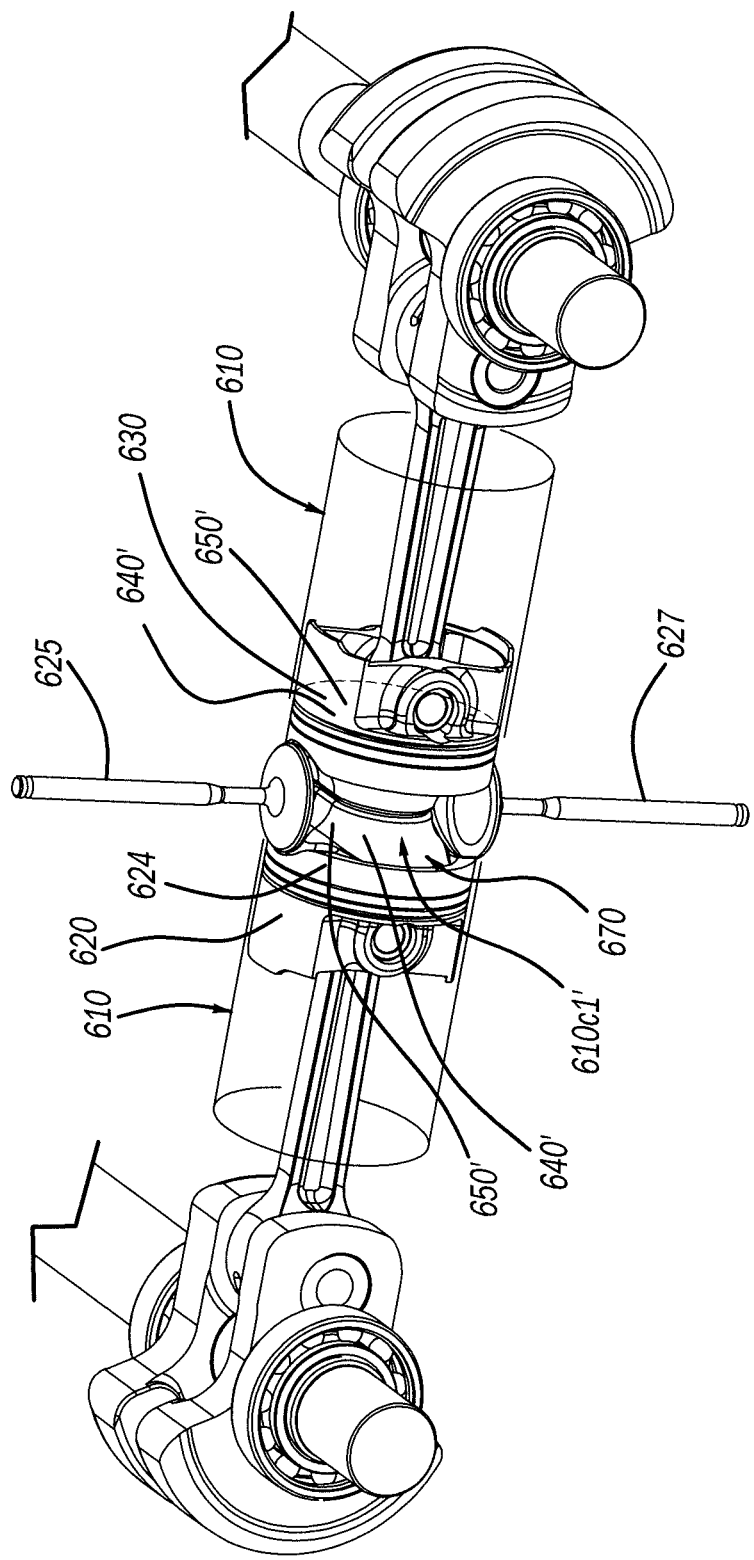
FIG. 22 illustrates a combustion chamber within a cylinder, as exemplified in accordance with the present invention.
Figure 23:
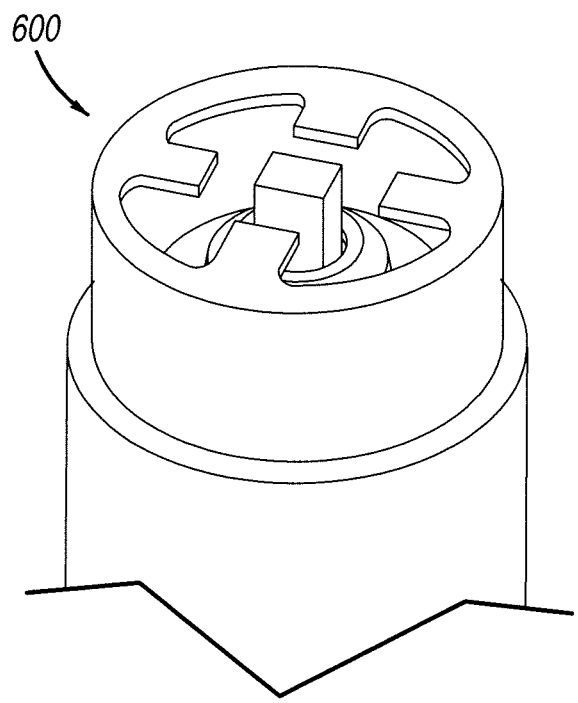
FIG. 23 illustrates a first spark plug in an ignition system of the present invention.
Figure 24:
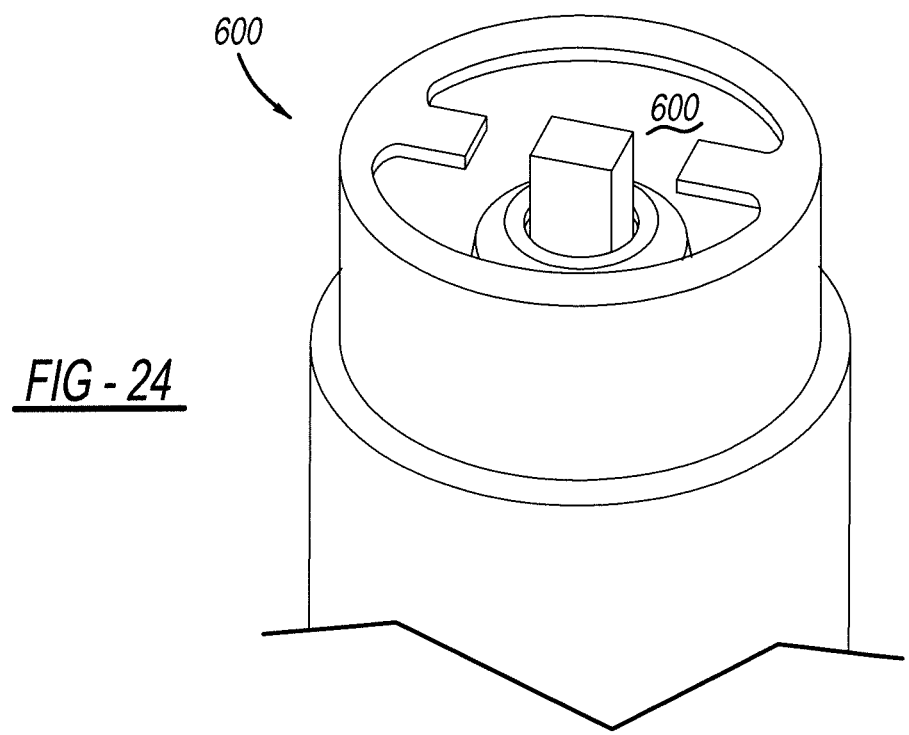
FIG. 24 illustrates a second spark plug in an ignition system of the present invention.
Figure 25:
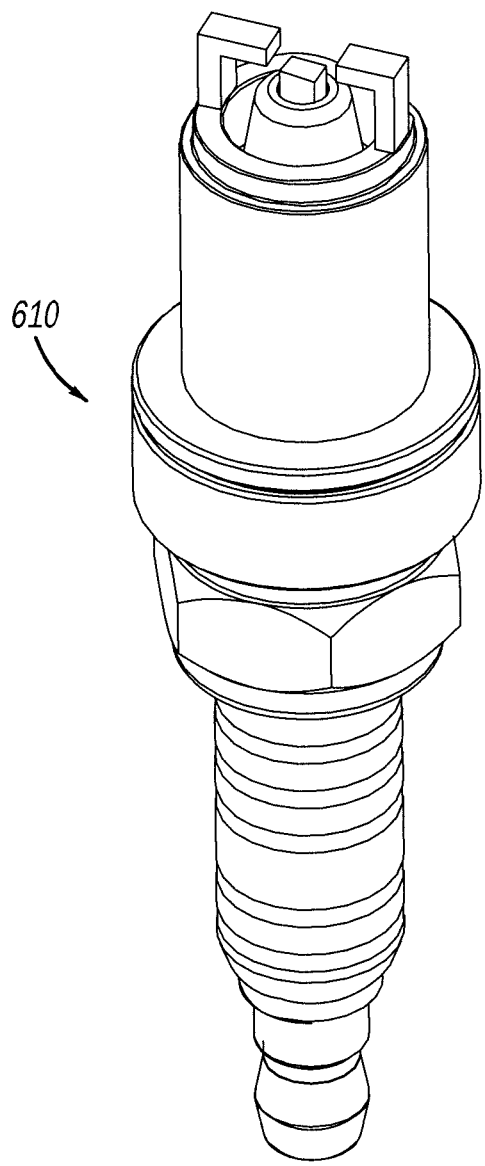
FIG. 25 is a perspective view of the second spark plug shown in FIG. 24.
Figure 26:
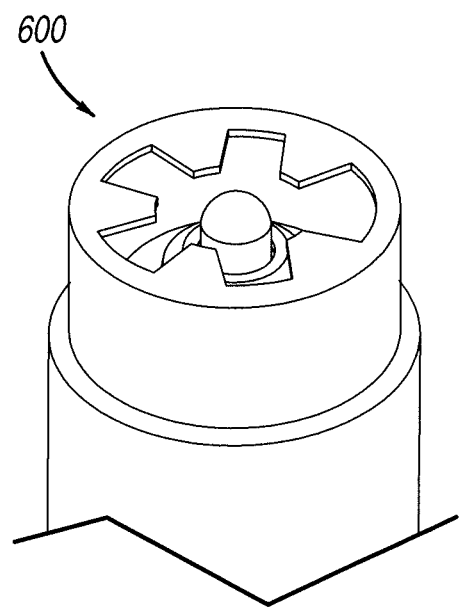
FIG. 26 illustrates a third spark plug in an ignition system of the present invention.
Figure 27:
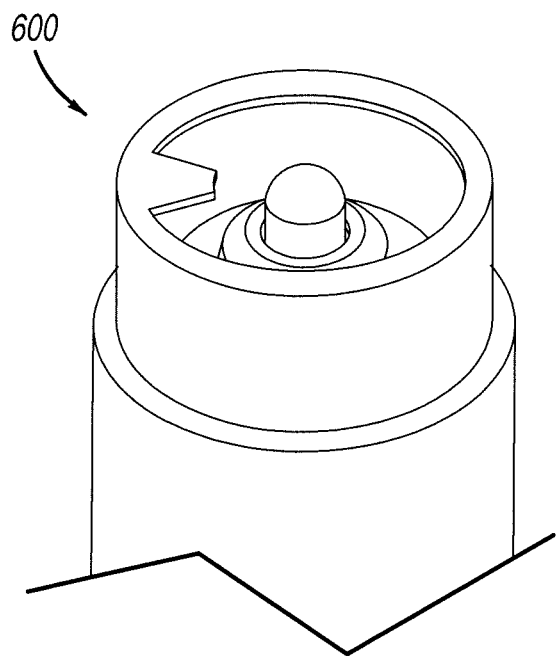
FIG. 27 illustrates a close-up view of the interface between one of the ground conductors and the central conductor of the third spark plug of FIG. 26.
Figure 28:
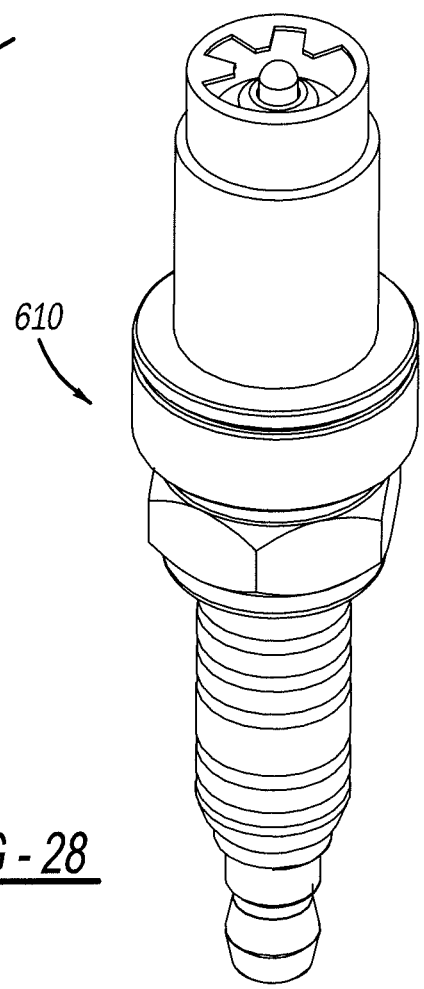
FIG. 28 illustrates a perspective view of another spark plug in accordance with the present invention.

In yet another aspect of the invention, a spark or ignition system 600 is presented. As shown in the FIGS. 23-30 illustrating the spark/ignition system 600, the spark plugs 610 can be positioned about the combustion chamber 620 in predetermined positions, depending on various design criteria, such as the concentration of injected fuel within the associated combustion chamber 620, the shape of the piston faces 630 that form opposed sides of the combustion chamber 620, and so forth. In essence, positioning a pair of plugs at 8:00 and 10:00 positions for example, permits the spark to efficiently engage the air/fuel mixture at the points of greatest concentration, thereby optimizing the fuel efficiency and combustion efficiency of the opposed piston engine. It will be appreciated that the spark plugs can be positioned at various positions about the circumference of the combustion chamber, depending on the geometry of the associated piston face, for example. Stated another way, the spark plugs may be positioned in areas that have a relatively greater density of fuel-air mixture. To illustrate, and with reference to FIGS. 18-21, two opposed piston faces that have an hour-glass shaped recess on a first piston face and a complementary hour-glassed extrusion on the second opposed piston face may result in a greater fuel-air mixture outside of the hour glass shaped union within the vacant areas (e.g., 640b, 650b in FIG. 20) of the combustion chamber 620. When locating the spark plugs at these vacant areas of the combustion chamber 620, it has been found that the ignition efficiency is enhanced.

In yet another novel embodiment of an ignition system of the present invention, and referring to FIG. 29, one electrode or spark plug 610, is positioned at a 9:00 position of the combustion chamber 620, and represents a positive charge. In operable communication therewith, a second negative or ground electrode is positioned opposite the positive electrode at the 3:00 position of the combustion chamber 620, and being fixed to an associated cylinder, functions as the ground for the charge provided by the first electrode. The positive electrode and/or the negative electrode may be adjustably positioned within the central region of the combustion chamber by adjusting the length of the respective electrode as it extends toward the central region of the combustion chamber. Accordingly, a charge generated by the first positive electrode will jump the gap to the second negative electrode as it is grounded, and in doing so, will ignite and begin the combustion process of the air/fuel mixture in the combustion chamber 620. As with the embodiment described in the preceding paragraph, and as exemplified in FIG. 30, it will be appreciated that the spark plugs can be positioned at various positions about the circumference of the combustion chamber, depending on the geometry of the associated piston face, for example. It is believed that a center or approximately central location of the spark gap reduces the swirl of the air/fuel mixture, thereby facilitating greater efficiency when igniting the air/fuel mixture. Furthermore, it is also believed that orienting the spark gap in the center or at least approximately central of the combustion chamber increases the combustion speed by about 100%.

The term "central" is understood to mean within a central region, wherein the central region radially outwardly extends from a longitudinal axis of the cylinder to about half of the radius of the cylinder, along a portion of the length of the cylinder that defines the length of the combustion chamber.

In yet another aspect of the invention and again referring to FIGS. 23-30, a novel spark plug 610 is presented with a central and shielded positive electrode to generate a charge. A plurality of ground electrodes are integrally formed or fixed within a housing of the spark plug, wherein each of the ground electrodes extend radially inwardly from the spark plug housing and are circumferentially and equidistantly oriented about the positive electrode. As shown in the drawings, exemplary spark plugs may contain negative or ground electrodes that are two in number, or that are four in number, such as in a "clover square" arrangement, for example. Or, other exemplary spark plugs may contain negative electrodes that are five in number, such as in a pentagon arrangement. This is believed to contribute to the overall durability of the sparking/ignition mechanism. As shown in the Figures, the shielded center is center-dropped at approximately 45 degrees from the inner periphery of the negative electrodes. It is believed that the 45 degree angle facilitates a shorter distance of travel to the ground, and, therefore reduces the resistance the spark needs to overcome. Furthermore, the shielded arrangement of the positive electrode from certain internal forces and heat preserves the longevity of the spark plug. The arrangement of the negative electrodes about the central positive electrode also provides a fixed gap that therefore prevents ground distortion. An open spark permits maximum efficiency in the ignition of the air/fuel mixture. Yet further, it is believed that redundancy, or multiple grounds for the open spark as represented by the plurality of negative electrodes, prevents fouling and increases combustion speed.

In sum, the present invention provides the ability to target the spark within the combustion chamber, and, to provide a more efficient ignition system by providing a circumferential ground about the positive spark electrode.

What is claimed is:

1. A four-stroke opposed-piston engine comprising:
   a cylinder having a periphery;
   a first piston and a second piston opposed to said first piston, each piston contained within said cylinder, said first piston containing a first shaped piston face, and said second piston containing a second shaped piston face;
   a combustion chamber defined by said first shaped piston face, and said second shaped piston face in opposition to said first shaped piston face, within said cylinder, where said combustion chamber comprises a fuel-rich predetermined region; and
   a non-rotatable electrical delivery, ignition system fixed to said cylinder periphery and at least partially contained within said combustion chamber, wherein said ignition system comprises one or more first spark plugs located at first positions on the periphery of the cylinder, and, one or more second spark plugs located at second positions on the periphery of the cylinder, and where at least one of said first or second spark plugs comprises a shielded center electrode and at least one other of said first or second spark plugs comprises a negative electrode, wherein the center electrode is downwardly positioned at an approximate 45-degree orientation from the at least one other spark plug comprising the negative electrode, wherein during combustion, said ignition system is adapted to generate ignition within the fuel-rich predetermined region of the combustion chamber.

2. The four-stroke opposed piston engine of claim 1, wherein said shielded center electrode comprises a positive electrode extending from a first cylinder peripheral position to a first predetermined position within the combustion chamber, and, said negative electrode comprises a ground electrode extending from a second cylinder peripheral position to a second predetermined position within the combustion chamber, wherein during operation of said engine, said positive electrode and said ground electrode electronically communicate.

3. The four-stroke opposed piston engine of claim 1 wherein said first spark plug comprises a plurality of electrodes.

4. The four-stroke opposed piston engine of claim 1 wherein said second spark plug comprises a plurality of electrodes.

5. The four-stroke opposed piston engine of claim 1 wherein said predetermined region is a central region of the combustion chamber.

6. The four-stroke opposed piston engine of claim 1 wherein said predetermined region is a region defined by at least one vacant space between the first and second shaped piston faces.

* * * * *